United States Patent
Stählin et al.

(10) Patent No.: US 11,129,024 B2
(45) Date of Patent: Sep. 21, 2021

(54) VEHICLE-TO-X COMMUNICATION DEVICE AND METHOD FOR REALIZING A SAFETY INTEGRITY LEVEL IN VEHICLE-TO-X COMMUNICATION

(71) Applicants: Continental Teves AG & Co. oHG, Frankfurt (DE); Continental Automotive Systems, Inc., Auburn Hills, MI (US)

(72) Inventors: Ulrich Stählin, Oakland Township, MI (US); Marc Menzel, Weimar (DE); Andrew Kirby, Palatine, IL (US)

(73) Assignees: Continental Teves AG & Co. oHG; Continental Automotive Systems, Inc., Auburn Hills, MI (US)

( * ) Notice: Subject to any disclaimer, the term of this patent is extended or adjusted under 35 U.S.C. 154(b) by 45 days.

(21) Appl. No.: 16/107,050

(22) Filed: Aug. 21, 2018

(65) Prior Publication Data
US 2020/0068405 A1    Feb. 27, 2020

(51) Int. Cl.
*H04W 12/10*    (2021.01)
*H04W 4/40*    (2018.01)

(52) U.S. Cl.
CPC ............. *H04W 12/10* (2013.01); *H04W 4/40* (2018.02)

(58) Field of Classification Search
CPC ................................ H04W 12/10; H04W 4/40
USPC ........................................................ 455/411
See application file for complete search history.

(56) References Cited

U.S. PATENT DOCUMENTS

| | | | | |
|---|---|---|---|---|
| 2012/0290198 A1* | 11/2012 | Firl | ...................... | G08G 1/0112 701/117 |
| 2015/0033357 A1* | 1/2015 | Habel | ..................... | G06F 21/60 726/26 |
| 2015/0210258 A1* | 7/2015 | Erdem | ...................... | B60T 8/00 701/29.2 |
| 2016/0373261 A1* | 12/2016 | Tschache | ................ | G06F 13/36 |
| 2017/0227614 A1* | 8/2017 | Scherr | ................ | G01R 33/0023 |
| 2018/0144640 A1* | 5/2018 | Price | .................... | G01G 19/086 |
| 2018/0189103 A1* | 7/2018 | Teshler | ................... | H04L 67/42 |
| 2019/0065785 A1* | 2/2019 | Barr | ......................... | G06F 21/44 |
| 2019/0162782 A1* | 5/2019 | Shanbhogue | .... | G01R 31/31919 |
| 2019/0258251 A1* | 8/2019 | Ditty | .................... | G05D 1/0274 |
| 2020/0192775 A1* | 6/2020 | Venu | .................. | G06F 11/0772 |

FOREIGN PATENT DOCUMENTS

| | | | | |
|---|---|---|---|---|
| DE | 102014226032 A1 * | 6/2016 | .......... | H04L 9/3239 |
| DE | 102016212196 A1 * | 1/2018 | .............. | G08G 1/04 |

* cited by examiner

*Primary Examiner* — Charles N Appiah
*Assistant Examiner* — Nicole M Louis-Fils
(74) *Attorney, Agent, or Firm* — RatnerPrestia

(57) ABSTRACT

A vehicle-to-X communication apparatus includes a generating device which is designed to generate a vehicle-to-X message to be sent, a signing device which is designed to sign the vehicle-to-X message to be sent, a first verification device which is designed to verify the vehicle-to-X message to be sent, a transmitting device which is designed to send the vehicle-to-X message. The first verification device is configured according to a higher safety integrity level than the generating device, the signing device and/or the transmitting device. Furthermore, a corresponding method as well as the use of the apparatus in a vehicle or an infrastructure facility is disclosed.

15 Claims, 2 Drawing Sheets

VEHICLE-TO-X COMMUNICATION DEVICE AND METHOD FOR REALIZING A SAFETY INTEGRITY LEVEL IN VEHICLE-TO-X COMMUNICATION

FIELD OF THE INVENTION

The present invention relates to a vehicle-to-X communication apparatus and a method for attaining a safety integrity level in vehicle-to-X communication.

BACKGROUND OF THE INVENTION

Vehicle-to-X communication is currently on its way to being introduced into series production. In particular, it is provided in this case that vehicles send vehicle-to-X messages at specific intervals or during specific events, said vehicle-to-X messages comprising, for example, information regarding the speed, position, course, acceleration or particular events such as, for example, breakdowns or emergency braking maneuvers. The currently relevant standards are IEEE802.11(p), IEEE1609, SAE 2735, SAE 2945 and ETSI ITS-G5, each of which incorporated herein by reference. New standards are additionally being drawn up at present by 3GPP for Cellular-V2X (C-V2X), incorporated herein by reference.

The disadvantage of the present prior art is that the hardware and software used in a vehicle-to-X communication apparatus does not, at present, always allow classification in a required safety integrity level, in particular according to the Automotive Safety Integrity Level (ASIL), incorporated herein by reference, with only limited confidence in the integrity of received vehicle-to-X messages being possible as a result.

SUMMARY OF THE INVENTION

An aspect of the invention aims to provide a vehicle-to-X communication apparatus and a method which meet the requirements of a required safety integrity level and which can be realized with the smallest possible outlay.

An aspect of the invention relates to a vehicle-to-X communication apparatus, comprising:
- a generating device which is designed to generate a vehicle-to-X message to be sent,
- a signing device which is designed to sign the vehicle-to-X message to be sent, in particular by means of an Elliptical Curve Digital Signature Algorithm (ECDSA),
- a first verification device which is designed to verify the vehicle-to-X message to be sent, in particular a signature of the vehicle-to-X message to be sent,
- a transmitting device which is designed to send the vehicle-to-X message, in particular by means of an antenna, wherein
  the first verification device is configured according to a higher safety integrity level than the generating device, the signing device and/or the transmitting device.

One of the resulting advantages of an aspect of the invention is that the process of sending vehicle-to-X messages allows classification in a required safety integrity level, in particular according to the Automotive Safety Integrity Level (ASIL), wherein hardware or respectively software can be enlisted which does not have to be extensively ASIL certified, that is to say which can basically be implemented with the hardware or respectively software which already exists. As a result, a required safety integrity level of the functional safety, e.g. ASIL B, of the entire vehicle-to-X communication apparatus and, consequently, of the vehicle-to-X communication as such can be advantageously made possible. As a result, protection against the transfer of modified information, in particular in the case of random and/or systematic errors, can in particular be implemented. In addition, the requirements of the performance of the vehicle-to-X communication, for example according to US DOT NPRM FMVSS No. 150, incorporated herein by reference, can be fulfilled with the vehicle-to-X communication apparatus according to an aspect of the invention.

The vehicle-to-X message comprises, in particular, data to be sent by means of vehicle-to-X communication, which have been provided, for example, by means of a data transmission means, e.g. data bus, to the vehicle-to-X communication apparatus of another vehicle system, as well as further data or respectively information for realizing the vehicle-to-X communication.

Alternatively, it can also in principle be provided that the hardware and/or software of the vehicle-to-X communication apparatus is substantially constructed completely in accordance with the required safety integrity level, which does however cause increased costs and as a result of which the availability of the components might be restricted.

In accordance with one embodiment, the vehicle-to-X communication apparatus comprises a plausibility checking device which is designed to check, at least to some extent, the plausibility of information comprised by the vehicle-to-X message to be sent. The plausibility checking device and the first verification device can expediently be configured as a joint inspecting device for realizing the functions indicated.

In accordance with one embodiment, the plausibility checking device is configured to check the plausibility of the information comprised by the vehicle-to-X message to be sent, to compare the information comprised by the vehicle-to-X message to be sent with patterns of previous vehicle-to-X messages to be sent and/or received. According to a further development, the plausibility check is deemed to be successful if the patterns of previous vehicle-to-X messages to be sent and/or received can be illustrated in the vehicle-to-X message to be sent, that is to say a predefined deviation tolerance of the information forming the basis thereof is not exceeded. Alternatively or additionally, it can be provided according to one embodiment, for the purposes of verification or respectively plausibility checking, that an inspection of a physical possibility of a vehicle movement and/or a comparison with data from vehicle sensors, e.g. speed, yaw rate, etc., is/are carried out.

According to a further development, the vehicle-to-X communication apparatus is configured to first carry out a plausibility check of the contents of a signed vehicle-to-X message to be sent by means of the plausibility checking device, and to afterwards carry out a verification of the vehicle-to-X message to be sent, in particular of the signature of the signed vehicle-to-X message to be sent, by means of the first verification device.

In accordance with one embodiment, the plausibility checking device is configured according to a higher safety integrity level than the generating device, the signing device and/or the transmitting device. The first verification device and the plausibility checking device are expediently configured according to a consistent safety integrity level.

The transmitting device is designed, in accordance with one embodiment, to send the vehicle-to-X message, in particular by means of an antenna, if the verification by the first verification device and/or the plausibility check by the plausibility checking device is/are deemed to be successfully concluded.

In accordance with one embodiment, the vehicle-to-X communication apparatus has a second verification device, wherein the second verification device is configured to verify a signature of a received vehicle-to-X message. A plausibility check of received vehicle-to-X messages can also be provided by means of the second verification device. The second verification device and the first verification device and/or the second verification device and the plausibility checking device can expediently be configured as a common inspecting device for realizing the indicated functions. For example, a separate microcontroller or respectively processor or a region of a die or respectively chip of a microcontroller or respectively processor can be provided for the verification devices and plausibility checking device.

In accordance with one embodiment, the second verification device is configured according to a higher safety integrity level than the generating device, the signing device and/or the transmitting device. The second verification device is expediently configured according to a safety integrity level which the first verification device and the plausibility checking device also have.

According to a further development, the second verification device is designed to verify a received vehicle-to-X message in terms of its relevance, in particular by inspecting the time stamp thereof and/or position information of a sender of the vehicle-to-X message comprised by this. The time stamp is expediently inspected by comparison with a current time, wherein it can be envisaged that vehicle-to-X messages are discarded where their time stamp displays an exceeding of a predefined age. Therefore, the use or enlisting of a sequence number for vehicle-to-X messages is advantageously not necessary either, since vehicle-to-X messages usually comprise all of the data required for the realization of the described procedure.

A receiver of a sent vehicle-to-X message can consequently identify whether the vehicle-to-X message or respectively data comprised by the latter has been intentionally or unintentionally falsified on the transmission path. By carrying out the steps indicated, a vehicle-to-X communication apparatus receiving the message fulfils the relevant requirements according to ISO26262 for ASIL certification, which is incorporated herein by reference.

In accordance with one embodiment, the generating device, the signing device and/or the transmitting device is/are configured according to a lowest safety integrity level, in particular according to an ASIL QM (Quality Management) classification. Components of the vehicle-to-X communication apparatus can therefore be developed as being substantially irrelevant to safety, in particular ASIL QM, as a result of which the vehicle-to-X communication apparatus can accordingly be manufactured more cheaply, since less development outlay and, possibly, cheaper components as well can be used than, for example, in the case of an alternative solution in which the components of the vehicle-to-X communication apparatus are constructed to be completely ASIL B-capable.

In accordance with one embodiment, the first verification device and/or the plausibility checking device and/or the second verification device is/are constructed according to an ASIL B, C or D classification, the construction of which is preferably realized according to ASIL B.

In accordance with one embodiment, the generating device is designed to realize or respectively execute a vehicle-to-X communication protocol stack, hereinafter referred to as a vehicle-to-X communication stack or stack. According to a further development, the vehicle-to-X communication stack is constructed according to an ASIL QM (Quality Management) classification.

In accordance with one embodiment, a computing unit forming the basis thereof, which comprises at least the generating device, the signing device and/or the transmitting device, is realized by means of a cellular modem chip (mobile radio modem), e.g. a Qualcomm modem chip, such as SDX24, wherein the cellular modem is in particular configured according to an ASIL QM classification.

In accordance with one embodiment, the first verification device and/or the plausibility checking device and/or, in particular, the second verification device is/are realized by means of a transceiver which, in particular, supports the standard IEEE 802.11p and/or a mobile radio standard, e.g. an NXP SAF5400 which is, in particular, configured in accordance with a safety integrity level according to ASIL B, C or D.

In accordance with a further embodiment, the second verification device is realized by means of a microcontroller, e.g. a Traveo2.

In accordance with one embodiment, at least the transmitting device is configured by means of a transceiver which, in particular, supports the standard IEEE 802.11p and/or a mobile radio standard (C-V2X), e.g. NXP SAF5400 or respectively Qualcomm SDX24.

It should be understood that the generating device, the first verification device, the plausibility checking device, the second verification device, the signing device and/or the transmitting device can be expediently realized by means of at least one processor or respectively microcontroller. The devices can, in the case of an individual processor or respectively microcontroller, be provided on a common die or respectively chip, wherein different regions of the die or respectively chip are in particular enlisted, e.g. in order to implement the, if applicable, various safety integrity levels accordingly. Alternatively or additionally, the indicated devices can also be provided on a plurality of dies or respectively chips and processors or respectively microcontrollers.

Furthermore, an aspect of the invention relates to the use of the vehicle-to-X communication apparatus in a vehicle or an infrastructure facility. The vehicle can be, for example, a motor vehicle, in particular a car, a truck, a motorcycle, an electric vehicle or a hybrid vehicle, a water craft or an airplane.

Furthermore, the an aspect of invention relates to a method for attaining a safety integrity level in vehicle-to-X communication and, in particular, execution by an embodiment of the vehicle-to-X communication apparatus according to an aspect of the invention, having the steps of:

generating, by means of a generating device, a vehicle-to-X message to be sent, signing, by means of a signing device, the vehicle-to-X message to be sent, verifying, by means of a first verification device, the vehicle-to-X message to be sent, in particular a signature of the vehicle-to-X message to be sent, sending, by means of a transmitting device, the signed and verified vehicle-to-X message to be sent, wherein the first verification device is configured according to a higher safety integrity level than the generating device, the signing device and/or the transmitting device.

Depending on the configuration of the apparatus or respectively of the method, the sequence of the steps of signing and verifying can in particular be transposed, the rule being that the step which is classified with the higher ASIL is expediently effected last.

Further preferred embodiments of the method according to an aspect of the invention are set out by the description of the embodiments of the vehicle-to-X communication apparatus according to an aspect of the invention.

According to a further aspect of the invention, the apparatus according to the invention is set up to carry out a method according to at least one of the above embodiments.

In one further development of the indicated vehicle-to-X communication apparatus, the indicated apparatus has at least one memory and a processor. In this case, the indicated method is stored in the form of a computer program in the memory and the processor is provided to carry out the method if the computer program is loaded from the memory into the processor.

According to a further aspect of the invention, a computer program comprises program code means in order to perform all the steps of one of the indicated methods if the computer program is run on a computer or one of the indicated apparatuses.

According to a further aspect of the invention, a computer program product contains a program code which is saved on a computer-readable data carrier and which, if it is run on a data processing device, performs one of the indicated methods.

BRIEF DESCRIPTION OF THE DRAWINGS

Some particularly advantageous configurations of aspects of the invention are indicated in the subclaims. Further preferred embodiments are set out by the following description of embodiment examples with reference to figures, wherein:

DETAILED DESCRIPTION OF THE PREFERRED EMBODIMENTS

Figure 1:
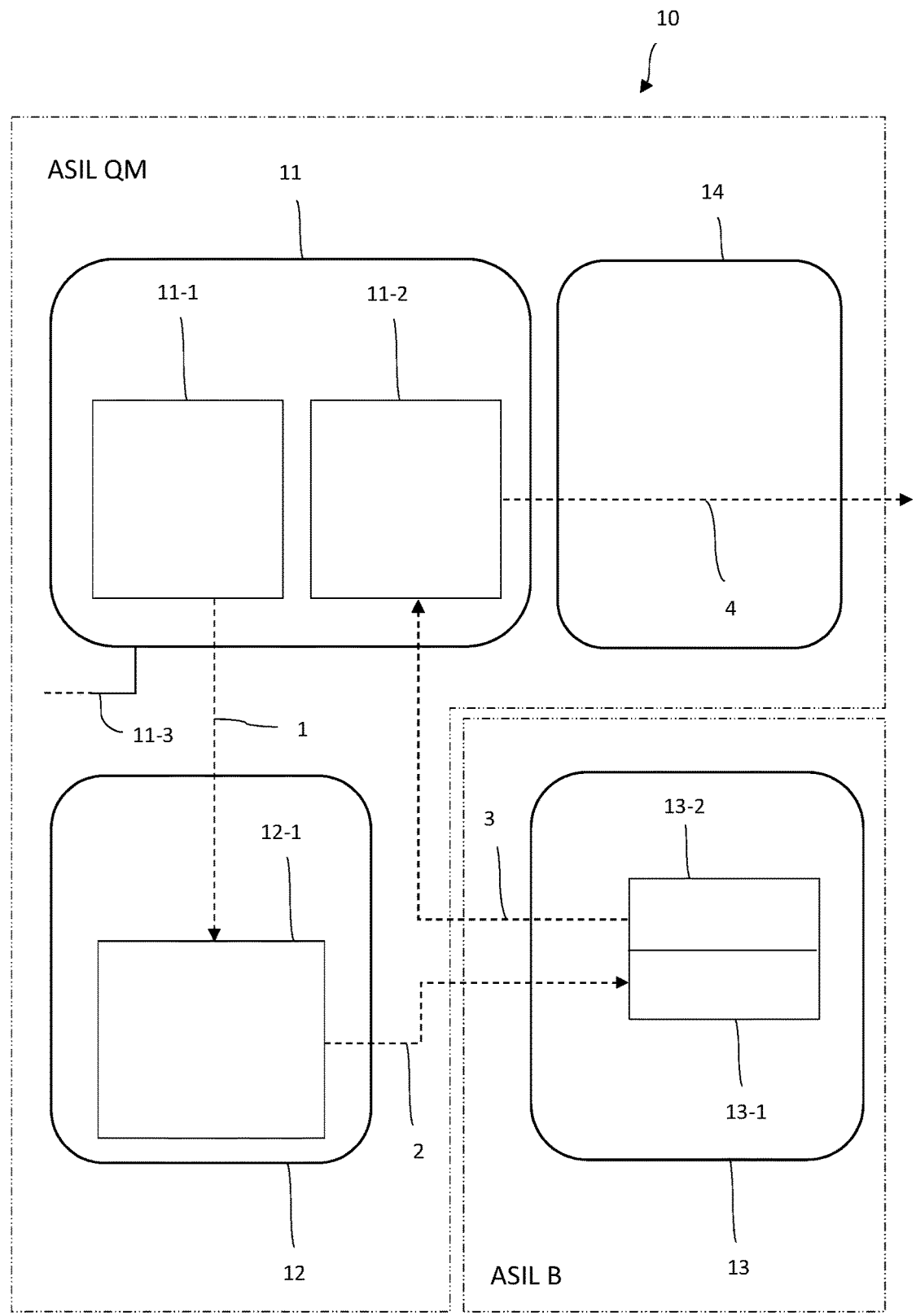
FIG. 1 schematically represents one embodiment example of a vehicle-to-X communication apparatus according to an aspect of the invention, and FIG. 2 schematically represents one embodiment of the method according to an aspect of the invention.

FIG. 1 shows one embodiment example of a vehicle-to-X communication apparatus 10 according to an aspect of the invention. This comprises an electronic computing device 11 which is designed to generate, in a first step 1, a vehicle-to-X message to be sent by means of a vehicle-to-X communication stack 11-1 on the basis of data provided by means of a data bus 11-3 of a relevant vehicle and to transmit it to a signing device 12. The signing device 12 is designed to sign the vehicle-to-X message to be sent by means of ECDSA (Elliptic Curve Digital Signature Algorithm) 12-1 and, in a step 2, to transmit it to a plausibility checking device 13-1 of a further electronic computing device 13, in order to check the plausibility of the signed vehicle-to-X message to be sent. In order to check the plausibility, the contents of the vehicle-to-X message to be sent are initially inspected in terms of its plausibility, according to the example in that said contents are compared with abstract patterns of previous vehicle-to-X messages to be sent and, if they substantially correspond, they are evaluated as plausible. The signature of the vehicle-to-X message to be sent is subsequently verified by means of a verification device 13-2 of the further electronic computing device. Following a successful verification process, the verified and signed vehicle-to-X message to be sent is transferred by the further electronic computing device 13, in a step 3, to a transmitting device 11-2 of the electronic computing unit 11 for sending in step 4 by means of an antenna 14. The electronic computing device 11 and the further electronic computing device 13 can be provided separately on a single die or respectively chip or on multiple dies or respectively chips.

The electronic computing device 11 is configured, according to the example, to run a Linux operating system, which are classified or respectively configured jointly as an ASIL QM System. Accordingly, the communication stack 11-1 and the transmitting device 11-2 are constructed according to ASIL QM. The same applies to the signing device 12 and the antenna 14. Unlike the computing device 11 having the communication stack 11-1 and transmitting device 11-2, as well as the signing device 12 and antenna 14, the further electronic computing device 13 according to the example is set up to run an AUTOSAR operating system which is classified or respectively configured according to ASIL B. The plausibility checking device 13-1 as well as the verification device 13-2 are, accordingly, likewise configured according to ASIL B. The plausibility checking device 13-1 and the verification device 13-2 are consequently configured according to a higher safety integrity level than the communication stack 11-1, the transmitting device 11-2 as well as the signing device 12.

The process of processing vehicle-to-X messages to be sent can consequently be advantageously classified according to ASIL-B, as a result of which sent vehicle-to-X messages have a comparatively high measure of confidence, and errors, such as interference on the transmission path, can likewise be identified by a receiving vehicle-to-X communication apparatus.

Figure 2:
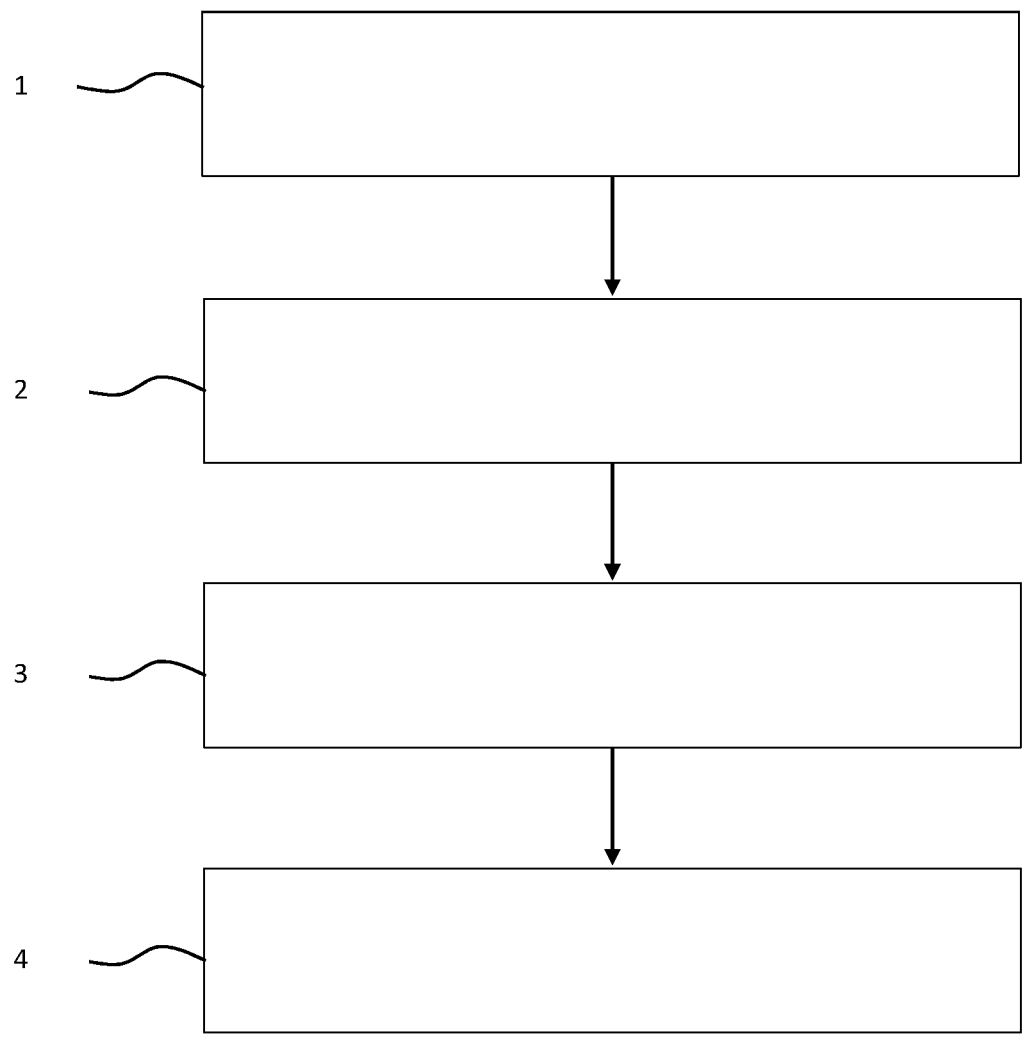

FIG. 2 shows an embodiment of the method according to an aspect of the invention for execution with the vehicle-to-X communication apparatus 10 according to FIG. 1. In the first step 1, a vehicle-to-X message to be sent is generated by means of the vehicle-to-X communication stack 11-1, in particular by a processor, and is transmitted to the signing device 12 for signing, wherein the vehicle-to-X message is signed by means of ECDSA 12-1. In step 2, the signed vehicle-to-X message is transmitted to the plausibility checking device 13-1 which performs the plausibility check on the contents of the signed vehicle-to-X message. After successfully checking the plausibility, the signature of the vehicle-to-X message is verified by means of the verification device 13-2 and, in the event of a positive result, the signed and verified vehicle-to-X message to be sent is delivered in step 3 to the transmitting device 11-2 for sending by means of the antenna 14 in step 4.

If in the course of the proceedings it transpires that a feature or a group of features is not absolutely necessary, then the applicant here and now seeks a wording of at least one independent claim, no longer comprising the feature or the group of features. This may, for example, involve a sub-combination of a claim existing as at the application date or a sub-combination of a claim existing as at the application date restricted by further features. Such claims or combinations of features which are to be newly worded are understood to also be covered by the disclosure of this application.

It is further pointed out that configurations, features and variants of aspects of the invention which are described in the various embodiments or embodiment examples and/or shown in the figures, can be combined with one another as desired. Individual or multiple features are interchangeable as desired. Resulting combinations of features are understood to also be covered by the disclosure of this application.

Back references in dependent claims should not be construed as a waiver of the right to independent, objective protection for the features of the subclaims referred back to. These features can also be used in any combination with other features.

Features which are only disclosed in the description or features which are disclosed in the description or a claim only in conjunction with other features can, in principle, be of independent inventive relevance. They can therefore also be included separately in claims to distinguish from the prior art.

It should be pointed out in general that vehicle-to-X communication means, in particular, a direct communication between vehicles and/or between vehicles and infrastructure facilities. For example, therefore, vehicle-to-vehicle communication or vehicle-to-infrastructure communication may be involved. Where communication between vehicles is referred to within the framework of this application, this can essentially, for example, take place within the framework of vehicle-to-vehicle communication, which typically takes place without the intermediary of a mobile network or a similar external infrastructure and which can therefore be distinguished from other solutions which, for example, are based on a mobile network. For example, vehicle-to-X communication can take place using the standards IEEE 802.11p or IEEE 1609.4. Vehicle-to-X communication can also be referred to as C2X communication or V2X communication. The sub-areas can be referred to as C2C (Car-to-Car), V2V (Vehicle-to-Vehicle) or C2I (Car-to-Infrastructure), V2I (Vehicle-to-Infrastructure). The aspects of the invention expressly do not, however, exclude vehicle-to-X communication with the intermediary of, for example, a mobile network.

The invention claimed is:

1. A vehicle-to-X communication apparatus, comprising:
   a generating device, configured according to a first safety integrity level, generates a vehicle-to-X message to be sent, the vehicle-to-X message including content relating to movement of the vehicle,
   a signing device, configured according to a second safety integrity level, signs the vehicle-to-X message to be sent,
   a plausibility checking device, configured according to a third safety integrity level, which checks plausibility of the content of the signed vehicle-to-X message to be sent, by:
      comparing the content of the signed vehicle-to-X message to be sent to at least one of previous content of previous vehicle-to-X messages, the content relating to the movement of the vehicle, and the previous content relating to previous movement of the vehicle,
      determining that the content of the signed vehicle-to-X message is plausible when the comparison indicates a physically plausible movement of the vehicle, and
      determining that the content of the signed vehicle-to-X message is not plausible when the comparison does not indicate a physically plausible movement of the vehicle,
   a first verification device, configured according to the third safety integrity level, in response to the content of the signed vehicle-to-X message being determined as plausible, verifies a signature of the signed vehicle-to-X message to be sent, and
   a transmitting device, configured according to a fourth safety integrity level, in response to the content of the signed vehicle-to-X message being successfully checked for plausibility, and the signed vehicle-to-X message being successfully verified, sends the signed vehicle-to-X message, wherein
   the first safety integrity level, the second safety integrity level and the fourth safety integrity level implement an automotive safety integrity level (ASIL) quality management (QM) standard that does not implement automotive safety requirements, and
   the third safety integrity level implements at least one of ASIL A, ASIL B, ASIL C and ASIL D standards that implement automotive safety requirements.

2. The vehicle-to-X communication apparatus according to claim 1, further comprising a plausibility checking device which checks, at least to a predetermined extent, a plausibility of information comprised by the vehicle-to-X message to be sent.

3. The vehicle-to-X communication apparatus according to claim 2, configured to carry out a plausibility check of the vehicle-to-X message to be sent by the plausibility checking device and, following that, to carry out a verification of the vehicle-to-X message to be sent by the first verification device.

4. The vehicle-to-X communication apparatus according to claim 2, wherein the plausibility checking device for checking the plausibility of the information comprised by the vehicle-to-X message to be sent is configured in such a manner as to compare the information comprised by the vehicle-to-X message to be sent with patterns of previous vehicle-to-X messages to be sent and/or received.

5. The vehicle-to-X communication apparatus according to claim 2, wherein the plausibility checking device is configured according to a higher safety integrity level than that of the generating device, the signing device and/or the transmitting device.

6. The vehicle-to-X communication apparatus according to claim 2, wherein the transmitting device is designed to send the vehicle-to-X message to be sent if the verification by the first verification device and/or the plausibility check by the plausibility checking device is/are deemed to be successfully concluded.

7. The vehicle-to-X communication apparatus according to claim 1, wherein the vehicle-to-X communication apparatus has a second verification device, wherein the second verification device is configured to verify a signature of a received vehicle-to-X message.

8. The vehicle-to-X communication apparatus according to claim 7, wherein the second verification device is designed to verify a received vehicle-to-X message in terms of its relevance.

9. The vehicle-to-X communication apparatus according to claim 1, wherein the generating device, the signing device and/or the transmitting device is/are configured according to a lowest safety integrity level.

10. The vehicle-to-X communication apparatus according to claim 1, wherein the generating device, the signing device and/or the transmitting device is/are configured according to an ASIL QM classification.

11. The vehicle-to-X communication apparatus according to claim 2, wherein the first verification device and/or the plausibility checking device and/or a second verification device is/are configured according to an ASIL B, C or D classification.

12. The vehicle-to-X communication apparatus according to claim 1, wherein the generating device is designed as a vehicle-to-X communication protocol stack.

13. UA vehicle or an infrastructure facility comprising the apparatus of claim 1.

14. A method for attaining a safety integrity level, comprising:
- generating, by a generating device configured according to a first safety integrity level, a vehicle-to-X message to be sent, the vehicle-to-X message including content relating to movement of the vehicle,
- signing, by a signing device configured according to a second safety integrity level, the vehicle-to-X message to be sent,
- checking, by a plausibility checking device configured according to a third safety integrity level, a plausibility of the content of the signed vehicle-to-X message to be sent, by:
  - comparing the content of the signed vehicle-to-X message to be sent to at least one of previous content of previous vehicle-to-X messages or sensor information, the content relating to the movement of the vehicle, and the previous content relating to previous movement of the vehicle,
  - determining that the content of the signed vehicle-to-X message is plausible when the comparison indicates a physically plausible movement of the vehicle, and
  - determining that the content of the signed vehicle-to-X message is not plausible when the comparison does not indicate a physically plausible movement of the vehicle,
- in response to the content of the signed vehicle-to-X message being determined as plausible, verifying, by a first verification device configured according to the third safety integrity level, a signature of the singed vehicle-to-X message to be sent, and
- in response to the content of the signed vehicle-to-X message being successfully checked for plausibility, and the signed vehicle-to-X message being successfully verified, sending, by a transmitting device configured according to a fourth safety integrity level, the signed and verified vehicle-to-X message to be sent, wherein
- the first safety integrity level, the second safety integrity level and the fourth safety integrity level implement an automotive safety integrity level (ASIL) quality management (QM) standard that does not implement automotive safety requirements, and
- the third safety integrity level implements at least one of ASIL A, ASIL B, ASIL C and ASIL D standards that implement automotive safety requirements.

15. The vehicle-to-X communication apparatus according to claim 1, wherein the first safety integrity level, the second safety integrity level and the fourth safety integrity level are of a same level, different levels, or partly of the same level.

* * * * *